United States Patent
Wires

(10) Patent No.: US 6,936,197 B1
(45) Date of Patent: Aug. 30, 2005

(54) METHOD AND COMPOSITIONS FOR MANUFACTURING COATED PHOTOCHROMATIC ARTICLES

(76) Inventor: Duane L. Wires, 835 S. Main St., Findlay, OH (US) 45840

( * ) Notice: Subject to any disclaimer, the term of this patent is extended or adjusted under 35 U.S.C. 154(b) by 0 days.

(21) Appl. No.: 09/720,754

(22) PCT Filed: Jul. 22, 1999

(86) PCT No.: PCT/US99/16650
§ 371 (c)(1),
(2), (4) Date: Feb. 19, 1999

(87) PCT Pub. No.: WO00/05060
PCT Pub. Date: Feb. 3, 2000

Related U.S. Application Data

(60) Provisional application No. 60/121,796, filed on Feb. 26, 1999, provisional application No. 60/104,097, filed on Oct. 13, 1998, and provisional application No. 60/094,138, filed on Jul. 24, 1998.

(51) Int. Cl.⁷ .................................................. B29D 11/00
(52) U.S. Cl. ........................ 264/1.38; 249/117; 264/2.5; 425/174.4; 425/808
(58) Field of Search ................................. 264/1.7, 1.38, 264/2.5; 249/117, 105, 82, 53 R; 425/174.4, 808, 810

(56) References Cited

U.S. PATENT DOCUMENTS

| | | |
|---|---|---|
| 3,821,333 A | 6/1974 | Goodwin et al. |
| 3,881,683 A | 5/1975 | Whitney |
| 3,917,077 A | 11/1975 | Tusinski et al. |
| 3,946,982 A | 3/1976 | Calkins et al. |
| 4,085,919 A | 4/1978 | Sullivan |
| 4,132,518 A | 1/1979 | Rips |
| 4,190,621 A | 2/1980 | Greshes |
| 4,227,673 A | 10/1980 | Goodwin et al. |
| 4,251,474 A | 2/1981 | Blandin |
| 4,257,988 A | 3/1981 | Matos et al. |
| 4,441,795 A | 4/1984 | Lobdell |
| 4,474,355 A | 10/1984 | Greshes |
| 4,522,768 A | 6/1985 | Roscrow et al. |
| 4,524,035 A | 6/1985 | Neefe |
| 4,614,624 A | 9/1986 | Neefe |
| 4,623,496 A | 11/1986 | Verhoeven et al. |
| 4,645,317 A | 2/1987 | Frieder et al. |
| 4,693,446 A | 9/1987 | Orlosky |
| 4,728,469 A | 3/1988 | Danner et al. |
| 4,846,913 A | 7/1989 | Frieder et al. |
| 4,851,530 A | 7/1989 | Rickwood |
| 4,873,029 A | 10/1989 | Blum |
| 4,879,318 A | 11/1989 | Lipscomb et al. |
| 4,913,544 A | 4/1990 | Rickwood et al. |

(Continued)

FOREIGN PATENT DOCUMENTS

| | | |
|---|---|---|
| EP | 0 586 380 B1 | 5/1997 |
| EP | 0 656 827 B1 | 12/1998 |
| EP | 0 404 888 B1 | 8/1999 |
| WO | WO 90/05629 | 5/1990 |
| WO | WO 92/12851 | 8/1992 |
| WO | WO 94/04345 | 3/1994 |
| WO | WO 97/39880 | 10/1997 |
| WO | WO 99/06887 | 2/1999 |

*Primary Examiner*—Mathieu D. Vargot
(74) *Attorney, Agent, or Firm*—Benjamin A. Randall

(57) ABSTRACT

A method and apparatus for making a lens includes a front mold (90) which has a reflective, UV absorptive surface, a back mold (50) which is UV light transmissive and a gasket (60) which holds the molds and defines a lens forming cavity (78) therebetween which receives polymerizable resin material (130). The resin (130) in the lens forming cavity (78) is exposed to a source of UV light (20) to cure the resin (130) and form the lens. Photochromatic coatings can be applied to the lens and cured.

15 Claims, 6 Drawing Sheets

U.S. PATENT DOCUMENTS

| | | |
|---|---|---|
| 4,919,850 A | 4/1990 | Blum et al. |
| 4,921,205 A | 5/1990 | Drew, Jr. et al. |
| 5,316,702 A | 5/1994 | Blum et al. |
| 5,358,672 A | 10/1994 | Blum |
| 5,364,256 A | 11/1994 | Lipscomb et al. |
| 5,406,341 A | 4/1995 | Blum et al. |
| 5,415,816 A | 5/1995 | Buazza et al. |
| 5,514,214 A | 5/1996 | Joel et al. |
| 5,516,468 A | 5/1996 | Lipscomb et al. |
| 5,523,030 A | 6/1996 | Kingsbury |
| 5,529,728 A | 6/1996 | Buazza et al. |
| 5,531,940 A | 7/1996 | Gupta et al. |
| 5,689,324 A | 11/1997 | Lossman et al. |
| 5,708,064 A | 1/1998 | Coleman et al. |
| 5,928,575 A | 7/1999 | Buazza |
| 5,976,423 A | 11/1999 | Buazza |
| 5,989,462 A | 11/1999 | Buazza et al. |
| 6,022,498 A | 2/2000 | Buazza et al. |

US 6,936,197 B1

METHOD AND COMPOSITIONS FOR MANUFACTURING COATED PHOTOCHROMATIC ARTICLES

RELATED APPLICATIONS

The present application is a national stage of U.S. application PCT/US99/16600 filed Jul. 22, 1999, which is related to Provisional Applications Ser. Nos. 60/094,138 filed Jul. 24, 1998; 60/104,097 filed Oct. 13, 1998 and 60/121,796 filed Feb. 26, 1999.

TECHNICAL FIELD

This invention relates, in part, to the molding of plastic optical lenses, and in particular to the molding of plastic ophthalmic lens. This invention also relates to the use of photochromatic enamel material that can be used to coat various substrates such as plastic optical lenses, optical frames and fingernails.

BACKGROUND OF THE INVENTION

Many techniques have been developed for molding plastic lenses. Generally these techniques involve arranging two circular lens molds, known as half molds, in close alignment to form a casting cavity or opening between the two half molds. The half molds are generally made of glass and have inner surfaces which provide the desired curvature on a finished lens. A liquid resin material is inserted in the cavity and cured. Typically, the curing takes place through use of a catalyst by raising the temperature of the resin or by exposing the resin to ultraviolet light and then cooling the resin. One known polymer which has been used is a polyethylene glycol diallylcarbonate with the addition of a catalyst, for example, isopropyl percarbonate, and sold under the trademark CR39. However, the CR39 polymer when exposed to the curing process of exposure to elevated temperatures, has an undesirable shrinkage, sometimes approximately about 14%. The shrinkage causes the resin to pull away from the mold halves which allows air to enter the cavity causing damage to the lens. In certain techniques the half molds are held close alignment with a gasket. In the techniques where light is used to cure the resin, the gasket tends to block the light from curing the resin. In techniques where heat is used to cure the resin, the gasket tends to shrink during cure causing leaking of the resin or deformation of the lens being cast.

An additional drawback is that the CR39 type resins tend to take a long time, typically three hours to seventeen hours to cure. This lengthy curing time adds to the costs and time of preparation of the cast lens.

Plastic photochromatic lenses have been available in some form since the early 1980's. However, the early designs were of poor quality, and thus, have not been well accepted by the public. One type of photochromatic lens which enjoys the largest market share of photochromatic lens sales involves taking premanufactured lenses and, under pressure, injecting the photochromatic dye into the lens surface.

The process allows any lens manufacturer to send lenses to the color processing company and have the lenses converted into a photochromatic lens.

In the past, monomer and dye heat cured lens processes have been unsuccessful. Photochromatic dyes by their nature become unstable when exposed to the high temperatures required to cure lenses. The dyes also tend to react with the organic peroxides used to cure lenses, creating poor quality or non-changing lenses.

In addition, in certain applications, it is desired that the lenses and other substrates, have the capability to change color. Therefore, there is a need for a photochromatic coating material that can be readily applied to a suitable substrate to allow the substrate to change color when exposed to different wavelengths of light.

The present invention is also directed to methods and compositions for coating substrates with photochromatic coating materials which are easier to make and use than prior art coating compositions and which more quickly cure than prior art compositions.

Therefore, there is a need to develop an improved method of molding lenses which does not have these problems.

Therefore, there is also a need in the lens making business for a process to prepare lenses for eye glasses which can be quickly and inexpensively manufactured.

There is a further need for a method for making lenses which can be quickly produced without causing cracking of the plastic lens, optical distortions in the lens, or discoloration of the lens.

Further, there is a further need in the lens making business for a process where the lens and the lens making materials do not undesirably shrink or prematurely separate from the mold prior to curing.

There is also a need in the lens making business for a process to prepare lenses for eye glasses which can be quickly and inexpensively colored or tinted to a customer's desired shade.

The present invention is directed to methods, apparatuses and compositions for making plastic lenses that overcome the above discussed disadvantages and drawbacks in the prior art.

SUMMARY OF THE INVENTION

The present invention provides methods, apparatuses and compositions for making plastic lenses and, in particular, for optical lenses for eye glasses.

The present invention is useful in casting prescription spheric and aspheric single vision, bifocal and progressive lenses. The present invention is also useful in casting photochromatic lenses which can be made in a multitude of shades and colors. The present invention can be practiced by the user in an office setting, which reduces costs and time of lens preparation, while allowing the user to have greater control of the lens manufacturing process.

The method of the present invention allows the user to produce thinner lenses with less peripheral distortion since lenses with an index of refraction of 1.70 can be produced. According to the method of the present invention for making plastic lenses a UV sensitive polymerizable lens forming material is dispensed into a mold cavity. In embodiments where a photochromatic lens is desired at least one suitable photochromatic dye is added to the UV sensitive polymerizable lens forming material and mixed together prior to dispensing the lens forming material into the mold cavity.

The mold cavity is defined between a first, or front, mold member and a second, or back, mold member. The front mold and the back mold are held in a predetermined spaced apart relationship from each other by a gasket. The gasket has a desired plurality of inner edges or lips which removably seal the mold members to the gasket. A very rapidly polymerizable material is dispensed between the mold members.

The polymerizable lens forming material is exposed to diffused ultraviolet light for a short period of time from about two to about four minutes. Preferably the polymerizable lens forming material is exposed to ultraviolet light for about three minutes.

The front mold has a reflective inner surface to reflect UV light after the UV light passes through the polymerizable lens forming material. The reflective inner surface of the front mold allows more light energy to be directed to the polymerizing lens forming material which, in turn allows the polymerizing material to cure more quickly. The reflective inner surface of the front mold illuminates the entire resin material, thereby eliminating any shadow problems which occur in the prior art lens casting processes. In the prior art lens casting processes where front and back transparent molds are used, shadows are created. In the prior art lens casting processes, the shadows form defects in the polymerizing plastic due to the refraction of the UV light as it passes through a first transparent mold, the polymer material and then a second transparent mold.

In a preferred embodiment of the present invention, the UV light is diffused before it contacts the polymerizing material. The diffused UV light provides a uniform intensity of light exposure to the polymerizable lens forming material. In a preferred embodiment, the mold members are rotated during exposure to the diffused UV light to further the uniformity of light energy and the exposure of the polymerizable lens forming material to the UV light.

In a preferred embodiment, the back mold comprises a glass or other UV transparent material and the front mold comprises a reflective material which has a hard, non UV light absorptive surface. In a preferred embodiment, the front mold comprises a material such as a glass or mirror coated material, nickel or stainless steel material which may be coated with a hard scratch resistant material. In an especially preferred embodiment, a nickel mold is electroplated with a carbon surface that produces a hard diamond like surface as the mold. The hard smooth surface of the front mold allows the cast lens to be readily removed after the lens is cured.

In a preferred embodiment, the gasket is made of a ultraviolet transparent elastomeric material that holds its shape during the UV curing process. The gasket does not change shape or deform when exposed to the heat generated during the curing reaction of the UV light on the polymerizable lens forming material. The gasket has a first, lower annularly extending lip or edge which extends circumferentially around an inner surface of the gasket. The gasket also has a second, upper annularly extending lip or edge having a predetermined height. The upper edge extends circumferentially around the inner surface of the gasket. The height or thickness of the upper edge will vary from gasket to gasket, depending on the thickness of lens which is to be cast. The back mold member is positioned in the gasket such that a lower surface of the back mold member rests on the upper edge. When the front mold member is placed in abutting relationship to the lower edge, the gasket seals around the entire circumference of the front mold member. The upper edge of the gasket holds the back mold member in a spaced apart relationship from the front mold member. The back mold member and the front mold member define a space or casting cavity which receives the UV polymerizable lens forming material.

In a preferred embodiment, a lens casting assembly which comprises the front mold, the gasket, and the back mold, is held in a steady position so that the polymerizable lens forming material can be dispensed in the space defined between the front mold member and the back mold member.

In a preferred embodiment, during dispensing of the lens forming material in the lens casting assembly, the gasket is flexed or pulled away slightly from the edge of the back mold member and the polymerizable lens forming material is dispensed into the casting cavity. The gasket is preferably sufficiently flexible to allow the polymerizable lens forming material to be dispensed while keeping the front mold in a sealing relationship with the lower annular edge of the gasket. The polymerizable lens forming material does not leak from the casting cavity due to the presence of the lower, self sealing edge of the gasket.

According to the present invention, there is no need for adding heat or thermal energy to the casting process. Further, there is no need to cool or remove thermal energy from the polymerizable lens forming material after the lens has been cured with UV light.

The present invention also includes a polymerizable lens forming material which comprises a rapidly curing a mixture of a resin material which cures upon exposure to ultraviolet light and at least one photoinitiator which absorbs both ultraviolet light and visible light. The present invention still further includes a photochromatic lens forming material which comprises a mixture of the polymerizable lens forming material at lest one photochromatic dye. Suitable photochromatic dyes remain stable when exposed to the ultraviolet light which cures the resin material.

The present invention also relates to a photochromatic coating composition and its use as a coating for various substrates. The photochromatic coating compositions comprise at least one photochemical substance which has a induced reversible color change when exposed to different wavelengths of light, such as sunlight or ultraviolet radiation. When the light source is removed, the photochemical substance reverts back to the original color. The cycle times for color change differ depending on the medium in which the photochemical substance is dispensed.

The photochemical substances is mixed with at least one suitable medium and then is coated onto the substrate. The substrates can include such diverse articles as optical lenses, frames, and fingernails, both natural and artificial.

DESCRIPTION OF THE PREFERRED EMBODIMENT

Figure 1:
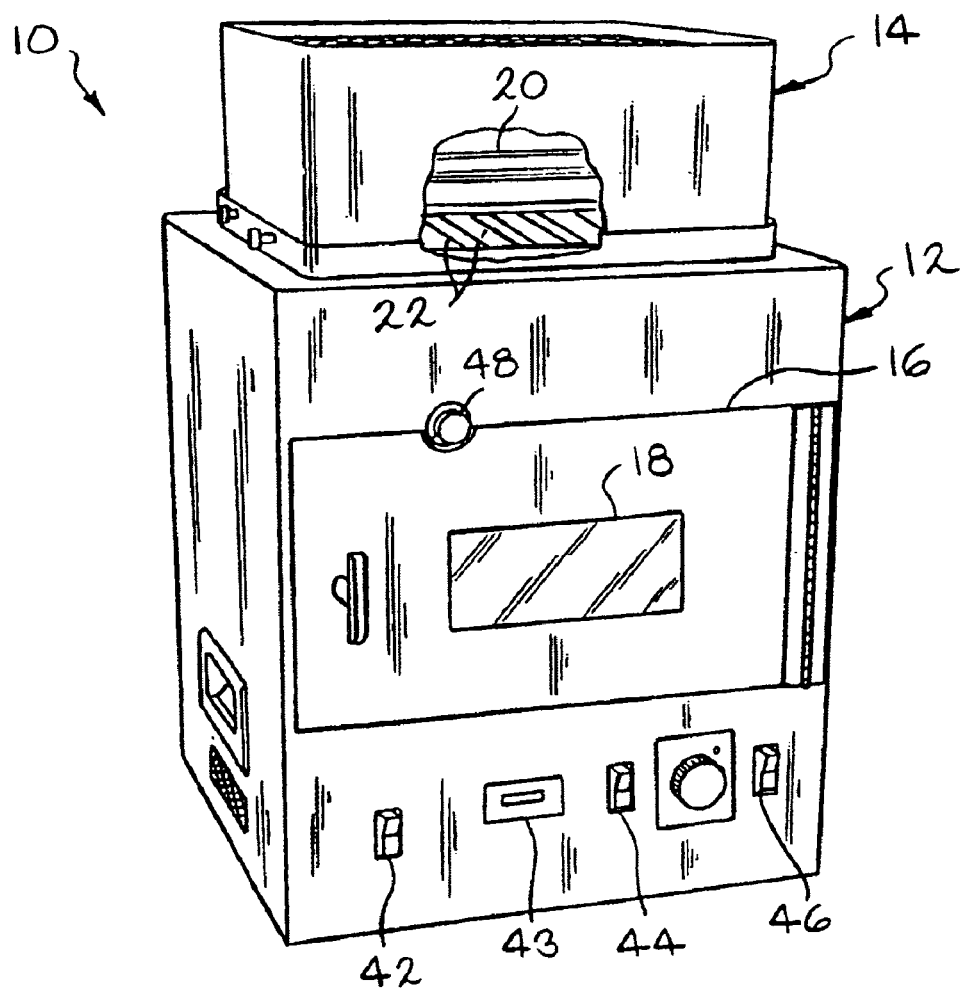
FIG. 1 is a perspective view, partially broken away, of an apparatus for producing a plastic lens.

FIG. 1 generally shows an apparatus 10 of the present invention which includes a curing chamber 12 and a UV lamp housing 14. The curing chamber 12 generally has a door 16 which can have a viewing window 18. The lamp housing 14 contains a UV lamp 20 which produces light in both the UV and visible light spectra. In a preferred embodiment, the lamp housing 14 can have a plurality of shutters 22. However, It is also within the contemplated scope of the present invention that the lamp housing 14 can have a shutterless system using a rapid start ballast to produce ultraviolet and/or visible light exposure to the curing chamber 12 without the need for shutters.

Figure 2:
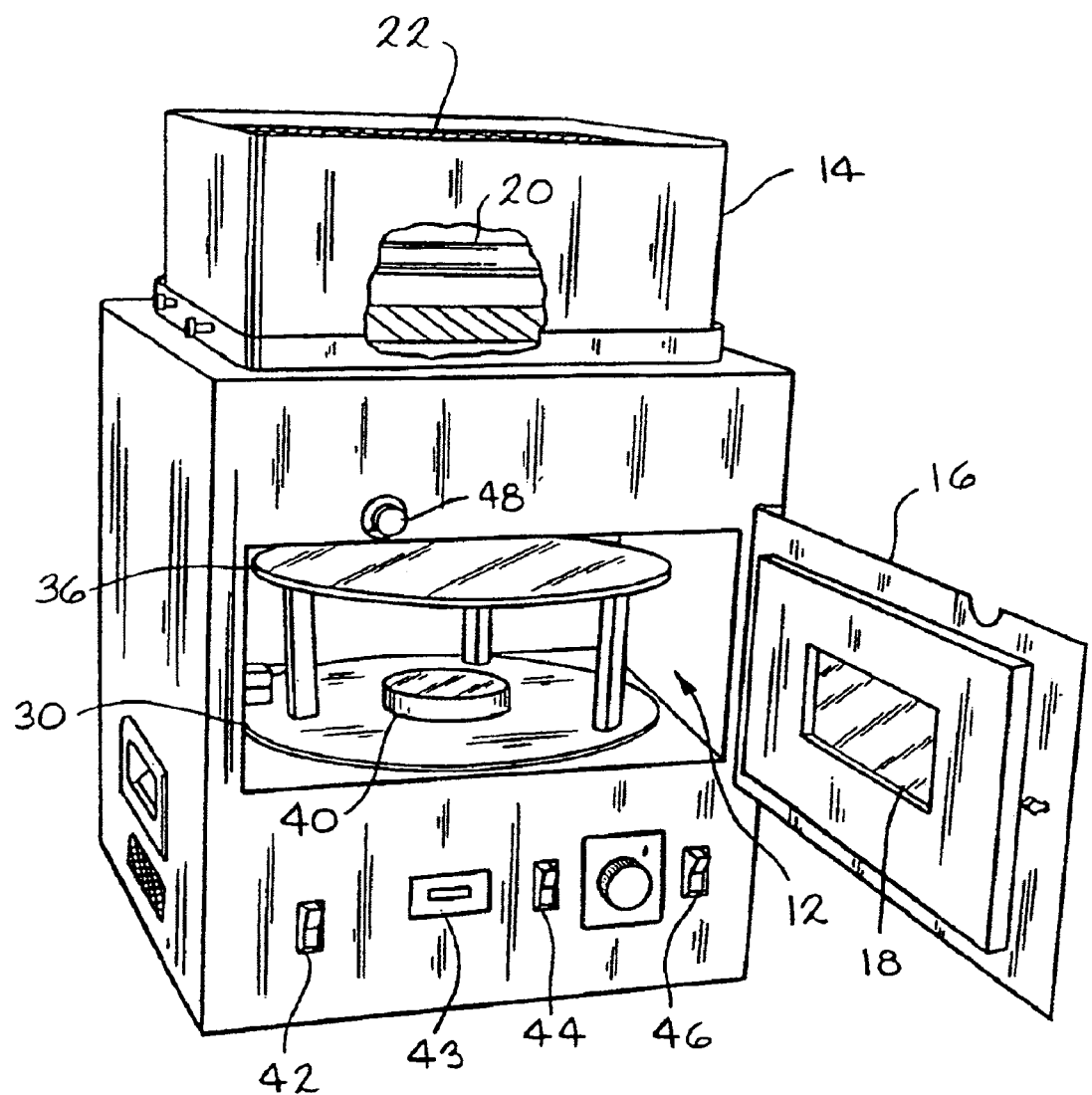
FIG. 2 is another perspective view of an apparatus for producing a plastic lens.

As shown in FIG. 2, the curing chamber 12 includes a carousel or rotating table 30 which is operatively connected to a motor (not shown) for turning the rotating table 30. In a preferred embodiment, the turntable makes between about 4 to about 6 resolutions per minute. The curing chamber 12 further includes a diffusion member or plate 36 made of a frosted glass which is removably positioned on the table 30 when the curing chamber 12 is in use.

It is to be understood that the lamp 20 preferably generates ultraviolet light having a wavelength in the range of about 300 nm to about 400 nm which is the preferred wavelength spectrum for curing polymer materials, as will be discussed in detail below. The intensity of the ultraviolet light is diffused as the light passes through the diffusion plate 36. The diffusion of the light and the rotation of the lens being cured on the turn table 30 provides an overall uniform curing of the polymerizable material.

FIG. 2 shows a mold assembly 40 (which will be explained in detail below) positioned on the rotating table 30. The rotating table 30 rotates the mold assembly 40 about an axis that extends in a perpendicular direction to the plane of the lens being cast. In the operation of the lens making apparatus 10, and on/off power-switch 42 is activated and an hour meter 43 is observed to determine whether certain adjustments are needed. A timer switch 44 is turned to an on position. A turn table switch 46 is moved to an on position. The shutters 22 are adjusted by moving a switch 48 from a closed to an open position. The UV light passes through the diffusion plate 36 and contacts the mold assembly 40, thereby allowing the rapidly curing polymerizable resin material to fully cure. The polymerizable material cures in a rapid time of less than about two minutes.

Those skilled in the art of lens making realize that lens forming materials take a long time to cure and have a tendency to shrink during cure. Accordingly, one aspect of the present invention is to provide an improved polymerizable material for lens making which does not have the drawbacks of the widely used CR39 type polymers.

According to another aspect of the present invention, the polymerizable lens forming material comprises a mixture of at least one monomer resin and at least one photoinitiator. In preferred embodiments the monomer material can be a CR424 monomer which is made by PPG Industries, Optical Products Group, Pittsburgh, Pa. The CR424 monomer properties are: 78% transmission through 50 mm; yellowness index of less than about 10, through about 50 mm; refractive index of 1.522, viscosity (centistokes at 25° C.) of 150 cps; density (g/cc at 25° C.) of 1.111; percent haze less than about 1%; storage stability (uninitiated at 20–25° C.–68–77° F.) of at least five months. The polymer properties are a transmission of about 90.97%; yellowness index (11.8 mm thickness) 0.63; refractive index 1.554; Abbe Number 38; density (g/cc at 25° C.) 1.205; Barcol Hardness (0–15 seconds) 13-6; Bayer Abrasion Resistance (comparison to the CR39 monomer) 0.75; polymerization shrinkage 8.20%; heat distortion temperature (° C. at 10 mil deflection) 51; and total heat deflection at 130° C. in mils (0.001 inches) 85. In another preferred embodiment; a monomer material known as CR427, also made by the PPG Industries is useful to produce lenses which are harder and more scratch resistant than lenses made using the CR424 monomer material.

The monomer is preferably mixed with a suitable non-peroxide based photoinitiator. The preferred mixture comprises a photoinitiator which cures uniformly throughout the polymerizable mixture, rather than a photoinitiator which is a surface cure initiator only that migrates in the mixture. The photoinitiator preferably exhibits an ultraviolet absorption spectrum over about 350–400 nm range and also absorbs light in the visible spectrum. In a preferred embodiment, the photoinitiator can comprise an Irgacure® 1700 material which produced by the CIBA Geigy Corporation and comprises about 25% bis(2,6-dimethoxybenzoyl)-2,4-,4-trimethylpentyl phosphine oxide (molecular weight, g/mole: 490.0) ($C_{26}H_{35}O_7P$) and about 25% 2hydroxy-2-methyl-1-phenyl-propan-1-one (molecular weight, g/mole: 164.2) ($C_{10}H_{12}O_2$). The Irgacure® 1700 material, when used with the polymerizable resin material, provides a very rapid rate of polymerization of less than about two minutes, and in certain embodiments, about one minute. The Irgacure® 1700 photoinitiator mixes readily with the CR424 and/or CR427 monomer and is stable over a five to six month period of time. It is to be understood that in certain embodiments, other photochemical initiators, including derivatives of acetophenone and benzophenone, including for example a Lucirintpo® diphenyl (2,4,6-trimethyl benzoyl), phosphine oxide material which is a photoinitiator made by the BASF Corporation can be used in the present invention.

The suitable monomer material has a very low shrinkage as compared to the CR39 material which allows the lens being cast to be completely polymerized and solidified within a period of about one to two minutes. The rotation of the lens on the turntable and the diffusion of the UV light as the light passes through the diffusion-plate provides a cast lens with no shadows or other distortions or crazing. The lenses produced according to the method of the present invention have high uniformity and are stable and resistant to stress or fractures.

According to one preferred embodiment, the polymerizable lens forming material composition of the present invention, includes about 80 to about 99.009% CR424 and/or CR427 monomer material and about 0.001 to about 1.0% of a photoimitator such as Irgacure® 1700 photo initiator. It is to be understood that various other optional ingredients can be included in the lens making composition which do not detract from the features of the lens crafting polymer composition. These and other ingredients can be used by those skilled in the art of lens making.

According to another aspect of the present invention, photochromatic lenses can be made using a mixture of the polymerizable lens forming material described herein and a photochromatic dye which is compatible with the UV curable resin material and the photoinitiator material. According to the present invention, the photochromatic dye is mixed into the polymerizable lens forming material prior to any curing of the lens forming material. The method of the present invention produces many colors of photochromatic lenses including red, green, blue, yellow, brown and gray. Useful photochromatic dyes include Reversacols dyes manufactured by the James Robinson Limited Company and distributed in the United States by the Keystone Aniline Corporation. The especially useful colors include Oxford Blue, Aqua Green, Sea Green, Berry Red, Flame Red, Rose Red, Plum Red, Palatinate Purple, Storm Purple, Rush Yellow and Corn Yellow.

The Reversacol type photochrornatic dyes include naphthopyran type dyes such as the Berry Red, Corn Yellow and Tangerine colors which have a chromene molecule type, while the Sea Green, Plum Red, Aqua Green, Oxford Blue, Claret, Palatinate Purple, and Storm Purple colors have a spirooxazine molecule type.

In certain embodiments, a photochromic yellow lens can be produced that is beneficial for patients requiring a blue light reduction and increased contrast. Patients with cataracts and patients participating in sports will benefit most from this tint.

A yellow lens can comprise a Reversacol Corn Yellow dye mixed in the polymerizable lens forming material in a concentration of about 0.05 to 0.2 grams per 1000 ml of lens forming material, depending on the degree of yellow required in the final activated lens.

A gray lens can comprise a mixture of Reversacol Berry Red, Sea Green, and Corn Yellow dyes in a concentration of about 0.01 to 0.2 grams per 1000 ml activated monomer.

A brown lens can comprise the gray lens formulation with an increase in Corn Yellow dye in the gray mixture.

A blue lens can comprise a mixture of Reversacol Palatine Purple, Oxford Blue and/or Storm Purple dyes in a concentration of about 0.01 to 0.2 grams of dye in 1000 ml activated monomer. This lens is a cosmetic deep blue photochromic lens.

A red lens can comprise a mixture of Reversacol Berry Red and/or Plum Red in a concentration of about 0.01 to 0.2 grams of dye in 1000 ml activated monomer. This lens is a cosmetic deep red photochromic lens.

A green lens can comprise a mixture of Reversacol Aqua Green and/or Sea Green dyes in a concentration of about 0.01 to 0.2 grams of dye in 1000 ml activated monomer. This lens is a cosmetic green photochromic lens.

This method of photochromic lens production allows the manufacturer to cast lenses directly to a patient's prescription, in a chosen color, while the patient waits, thus reducing lens inventory. Also, the photochromic lenses do not have to be precast and sent to another manufacturer for photochromic dye addition. It is also within the contemplated scope of the present invention that multiple color photochromic lenses can be cast by filling the mold with layers of different colors of the photochromic dye lens forming material.

Figure 3:
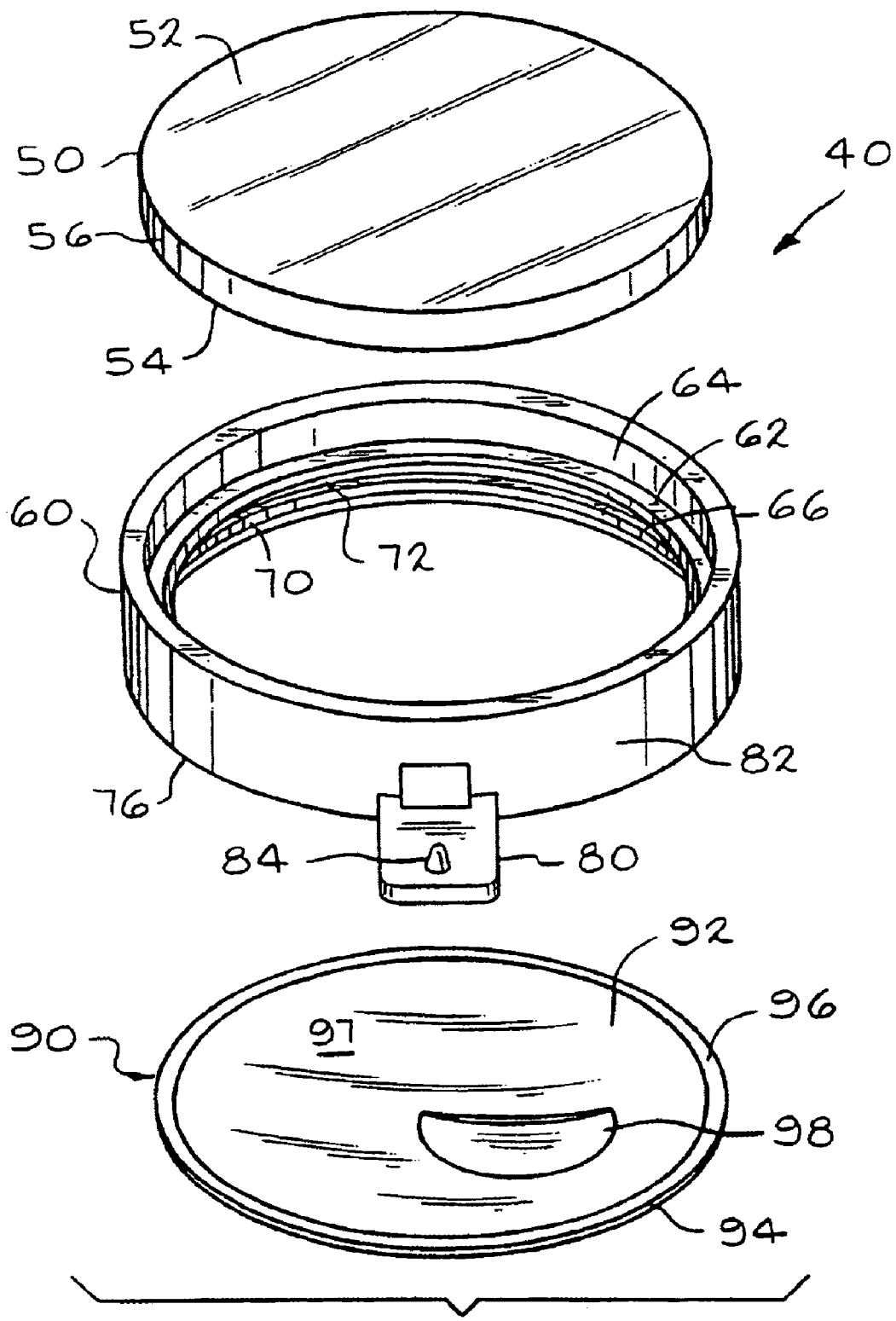
FIG. 3 is a perspective view of a lens casting mold component of the apparatus of the present invention.

Referring now to FIG. 3, the mold assembly 40 is shown in an exploded perspective view. The mold assembly 40 includes a back or top mold 50 preferably made of a glass material. The back mold 50 has an upper surface 52 and a lower surface 54. The back mold 50 has an edge 56 extending around the circumference of the back mold 50. The lower surface 54 of the back mold 50 has an optimum curvature which provides at least part of the required correction for the lens to be molded.

The lens assembly 40 further comprises a gasket 60 made of a flexible or elastomeric plastic material which is compatible with the polymerizable resin material. In the preferred embodiments, the gasket is made of a material which is ultraviolet light transparent. Suitable flexible materials which do not react with the lens casting polymers include polyvinyl chloride, soft polymethyl methacrylate and polyethylene, among others. It is to be understood that various flexible plastic materials which allow the transparency of ultraviolet light can be used with the present invention.

The gasket 60 defines an upper inner edge or lip 62 which extends in a radially inward direction circumferentially around an inner surface 64 of the gasket 60. The upper edge 62 has an annularly extending face or circumferential surface 66. The surface 66 has a desired predetermined height or depth. It is to be understood that various gaskets can have differing heights of the surface 66 so that different thicknesses of lens can be cast.

The gasket 60 defines a lower edge or lip 70 which extends in a radially inward direction around the inner surface 64 of the gasket 60. The lower edge 70 has an upper surface 72 which is in a spaced apart relationship to the upper edge 66, and a lower surface 74 which is in a spaced apart relationship to a bottom portion 76 of the gasket 60.

In various embodiments, the gasket 60 also has a tab 80 integrally molded with an outer surface 82 of the gasket 60. The tab 80 has a retaining plug or member 84 which secures the tab to a dispensing stand 100 when a polymerizable lens forming material 130 (either with or without at least one photochromic dye) is being injected between the back mold member 50 and a front mold member 90, as will be explained in detail below.

At The lens assembly 40 further comprises a front or bottom mold 90 which preferably is made of a metal material. The front mold 90 has an upper or inner surface 92 and a lower surface 94. The front mold 90 has a flat beveled rim or edge 96. In a preferred embodiment the front mold 90 is made of a nickel material which is electrocoated with a diamond like carbon coating 97. In certain preferred embodiments, when bifocal lens are to be casted, the front mold 90 can have a bifocal segment 98 on the inner surface 92.

When assembled in the gasket 60, the front mold member 90 and the back mold 50 define a cavity 78 which receives the polymerizable resin material 130. It is understood by those skilled in the art that the dimensions of the cavity 78 determine the shape of the lens to be cast.

Figure 4:
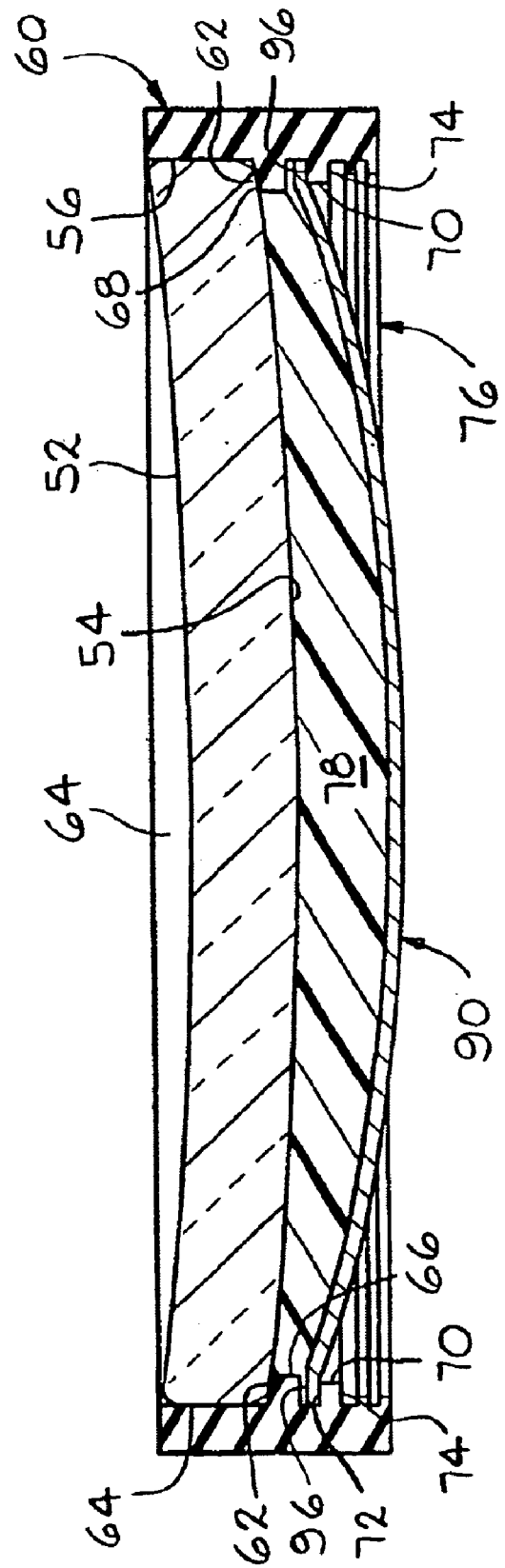
FIG. 4 is a cross-sectional view of a lens casting mold component for use in the apparatus of the present invention.
Figure 6:
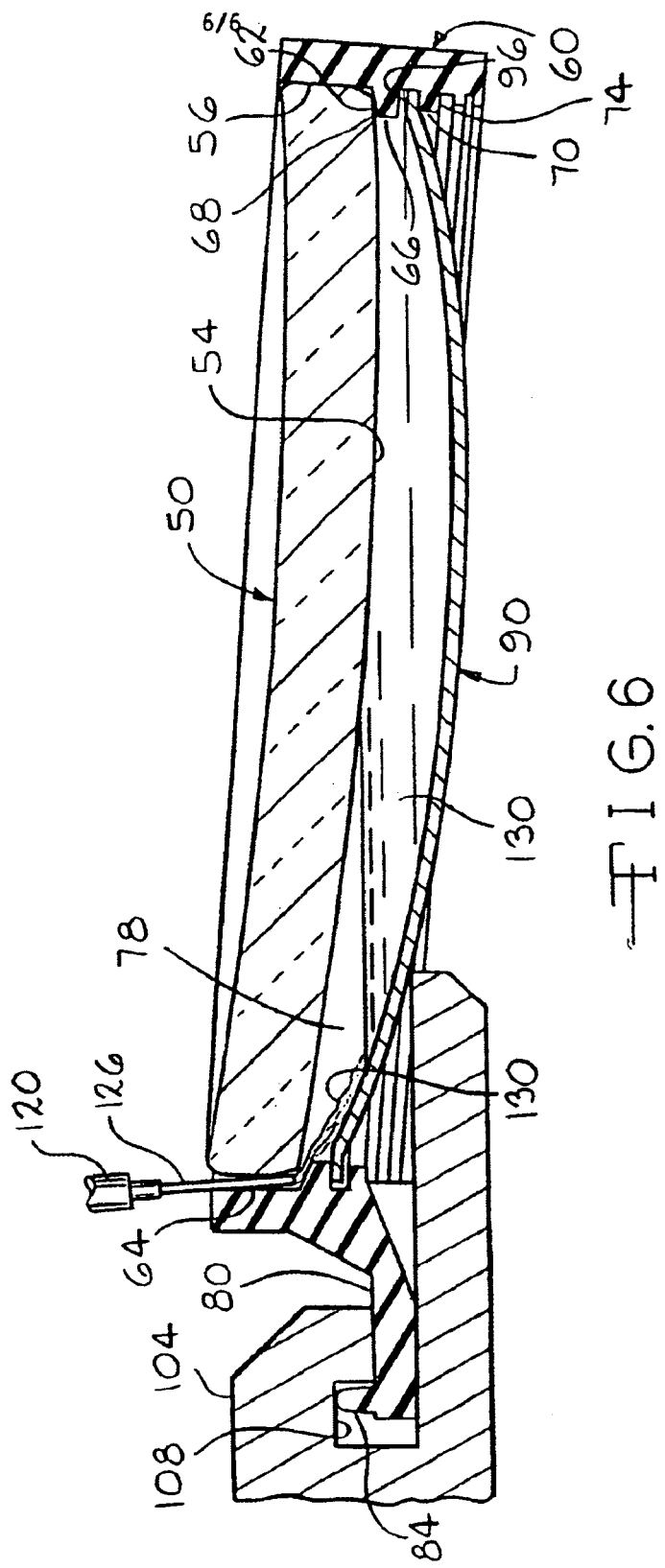
FIG. 6 is a cross-sectional view of a lens casting mold component being filled with a UV light curing polymer material while being held in the resin dispensing apparatus.

Referring now to FIGS. 4 and 6, the mold assembly 40 is shown ready to accept the resin material 130. The front mold 90 is positioned in the gasket 60. The beveled edge 96 of the front mold 90 is positioned on the upper surface 72 of the lower lip or edge 70. The flat beveled surface 96 of the front mold 90 is engaged in the space between the upper edge 62 and the lower edge 70. The lower edge 70 holds the front mold 90 in a secure position in the gasket 60.

The back mold 50 is placed in the gasket 60. The lower surface 54 of the mold 50 is adjacent upper surface 68 of the upper edge 62. The circumferential surface 56 of the back mold 50 is secured against the inner surface 64 of the gasket 60.

Figure 5:
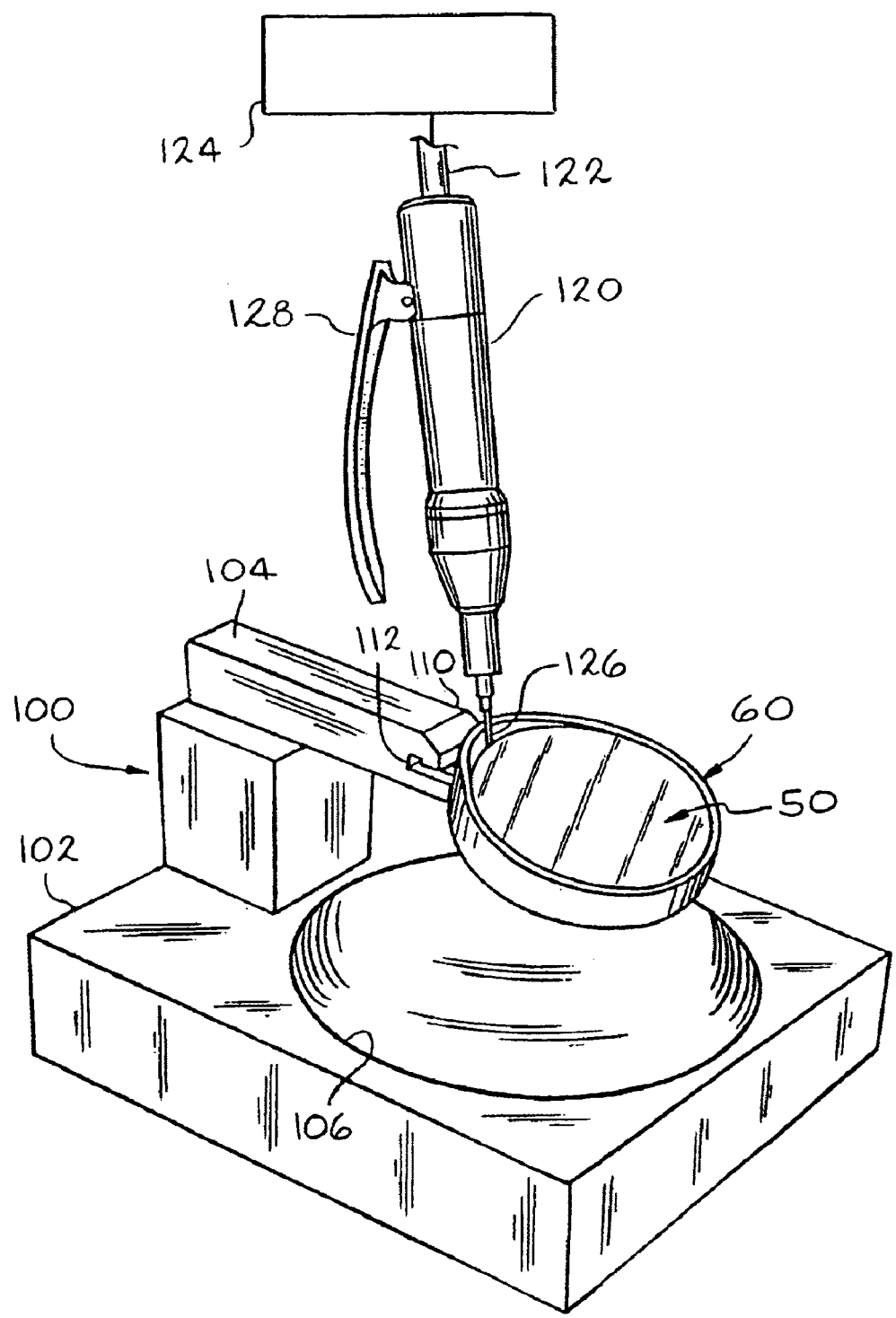
FIG. 5 Is a perspective view of a resin dispensing apparatus and the lens casting mold component.

Referring to FIG. 5 now, the dispensing stand 100 is generally shown. The dispensing stand 100 has a base 102 and a support arm 104 in a spaced apart relationship to the base 102. In a preferred embodiment the base 102 of the dispensing stand 100 defines a well 106 for receiving any excess resin material. The supporting arm 104 has a first or distal end 110 in a spaced apart relationship to the base 102. The distal end 110 defines an opening 112 for slideably receiving the tab 80 of the gasket 60.

A dispensing pen 120 is used to dispense a predetermined amount of the polymerizable resin material 130 into the mold assembly 40. The dispensing pen 120 is attached by a tube 122 to a pressurized container 124 in a manner which is well known in the art. The dispensing pen 120 has a tip 126 which allows the polymerizable resin material 130 to be accurately dispensed. In the embodiment shown, a handle 128 is retracted or squeezed by the user to dispense a predetermined amount of the polymerizable resin material 130. As shown in FIG. 6, the gasket 60 is stretched or flexed and the tip 126 is placed adjacent the side wall 64 of the gasket 60 in a manner such that the polymerizable resin material 130 flows into the cavity 78 defined between the front mold 90 and the back mold 50. The front mold 90 is held securely in position in the gasket 60 by the lower edge 70 of the gasket 60. The polymerizable resin material 130 flows to the circumferential surface 66 of the upper lip or edge 62 such that the polymerizable resin material 130 substantially completely fills the cavity 78.

After the polyrmerizable resin material 130 substantially fills the cavity 78, the mold assembly 40 is slideably removed from the opening 112 in the stand 100. It is to be understood that in certain embodiments a dispensing stand is not needed. The dispensing tip 126 can be inserted between the circumferential edge 64 of the gasket 60 and the circumferential edge 56 of the back mold 50 simply by flexing one edge of the gasket 60 in a direction away from back mold 50.

After the mold assembly 40 is filled with the polymerizable resin material 130, the mold assembly 40 is placed In the curing chamber 12 and is cured in a manner as described above.

After the polymerizable resin material 130 is cured, the user removes the gasket 60 and applies pressure to at least a portion of an edge of the cast lens, which allows the lens to be released from the front mold 90 and the back mold 50.

In other embodiments, it is possible to use a precast front or add plate to make polycarbonate lenses or to make lenses with photochromatic, antireflective, or antireflective photochromatic features. It is to be further understood that front molds can be formed such that bifocal or progressive lenses can also be cast by using the method and apparatus of the present invention.

Another aspect of the present invention relates to coating a substrate with a photochromatic coating material to produce an article that changes color when exposed to different wavelengths of light. It is within the contemplated scope of the present invention that the photochromatic dye compositions discussed above are useful in preparing the photochromatic coating composition. According to a preferred method, the photochromatic dyes are mixed with a suitable medium and coated onto the substrate.

In one embodiment, the photochromatic dyes are mixed with a suitable medium and coated onto at least one surface of an optical lens material, such as the optical lenses described above. However, it is also within the contemplated scope of the present invention that other types of optical lenses can be coated with the photochromatic composition to produce lenses which change color.

In another embodiment, at least one of the photochromatic dyes is added to a suitable base medium to make a photochromatic fingernail polish. In preferred embodiments, the photochromatic dyes are added at concentrations ranging from about 0.001% to about 0.1%, by weight, to a suitable base medium. Various suitable base media include, but are not limited to cyclomethicone, mineral oil, ethyl acetate, isopropyl alcohol, butyl acetate, propyl acetate, acrylates copolymer, epoxy resin, nitrocellulose, cellulose acetate butyrate, etocrylene benzophenone-1, isostearoyl hydrolyzed keratin, panthenol, n-butyl alcohol, polyester resin, formaldehyde resin, and the like. The coating composition can be cured by exposure to ultraviolet radiation for a rapid cure, or by exposure to air.

Having described the invention above, various changes from the specific materials, procedures and apparatus will occur to those skilled in the art. It is intended that all such variations are within the scope and spirit of the appended claims.

I claim:

1. A method for making a plastic lens comprising
providing a front mold having a reflective, non-ultraviolet (UV) absorptive inner surface;
providing a back mold which is UV light transmissive;
disposing the front mold and the back mold in a UV light transparent gasket, the gasket defining a lower inner edge for removably sealing the front mold to the gasket, the gasket further defining an upper inner edge for holding the back mold in a spaced apart relationship to the lower inner edge, the space between the upper and lower inner edges defining a lens forming cavity when the front mold and the back mold are positioned in the gasket;
the lower inner edge of the gasket extending in a radially inward direction around an inner surface of the gasket; the lower inner edge having an upper surface which is in a spaced apart relationship to the upper inner edge, the lower inner edge and the upper inner edge defining a space therebetween in which the front mold is removably sealed within and is held in position in the gasket by the lower inner edge;
dispensing a predetermined quantity of a UV curable lens forming resin material in the lens forming cavity, the resin material comprising at least one a polymerizable material and at least one photoinitiator, which cure when exposed to UV light; and,
exposing the dispensed resin material in the lens forming cavity to a source of UV light for a predetermined length of time at a predetermined intensity to cure the resin material without the need for either cooling or the addition of heat to the resin material.

2. The method of claim 1, in which the UV light passes through a diffusion member before the UV light passes through and cures the lens forming resin material.

3. The method of claim 2, in which the resin material in the lens forming cavity is rotated about an axis extending perpendicular to the plane of the lens during the curing of the lens forming resin material.

4. The method of claim 1, in which the front mold comprises a nickel material coated with a hard carbon surface.

5. The method of claim 1, in which the back mold comprises a transparent glass material.

6. The method of claim 1, in which the lens forming resin material is exposed to UV light for a period of two and a half minutes or less.

7. The method of claim 1, in which the gasket is removed, exposing the edge of the cured lens material and a force is applied at least a portion of an edge of the front and/or back molds to remove the lens from the front and back molds.

8. The method of claim 1, in which the photoinitiator comprises a mixture of bis(2,6-dimethoxybenzoyl)-2,4-,4-trimethylpentyl phosphine oxide and 2-hydroxy-2-methyl-1-phenyl-propan-1-one.

9. The method of claim 1, in which the resin material further comprisesat least one photochromatic dye material.

10. An apparatus for making a plastic lens comprising
front mold having a reflective, non UV absorptive inner surface;
back mold which is UV light transmissive;
UV light transparent gasket, the gasket having a lower inner edge for securing the front mold to the gasket and an upper inner edge in a spaced apart relationship to the lower inner edge for holding the back mold in a spaced apart relationship to the front mold, the spaced apart from mold and the back mold defining a lens forming cavity;

the lower inner edge of the gasket extending in a radially inward direction around an inner surface of the gasket, the lower inner edge having an upper surface which is in a spaced apart relationship to the upper inner edge, the lower inner edge and the upper inner edge defining a space therebetween in which the front mold is removably sealed within and is held in position in the gasket by the lower inner edge;

a means for dispensing a predetermined quantity of a UV curable lens forming resin material in the cavity, the resin material comprising a mixture of a polymerizable material and a photoinitiator which mixture cures when exposed to UV light in less than about two and one half minutes; and, a means for exposing the dispensed resin in the lens forming cavity to a source of UV light for a predetermined length of time at a predetermined intensity to cure the resin material without need for either cooling or the addition of heat to the resin material.

11. The apparatus of claim 10, wherein the UV light passes through a diffusion member before the UV light passes through and cures the lens forming resin material.

12. The apparatus of claim 11, wherein a turn table rotates the resin material in the lens forming cavity about an axis extending perpendicular to the plane of the lens during the curing of the lens forming resin material.

13. The apparatus of claim 10, wherein which the front mold comprises a nickel material coated with a hard carbon surface.

14. The apparatus of claim 10, wherein which the back mold comprises a transparent glass material.

15. A gasket for use in making a plastic lens comprising a UV light transparent gasket having (i) a lower inner edge, the lower inner edge extending in a radially inward direction around an inner surface of the gasket, the lower inner edge having an upper surface which is in spaced apart relationship to an upper inner edge, the lower inner edge removably sealing a front mold to the gasket and holding the front mold in the gasket; and (ii) the upper inner edge extending in a radially inward direction circumferentially around the inner surface, the upper inner edge having an annularly extending surface, the upper inner edge holding a back mold in a spaced apart relationship to the lower inner edge, the upper and lower inner edges defining a substantially self-sealing lens forming cavity when the front mold and the back mold are removably secured in the gasket, the lower inner edge and the upper inner edge defining a space therebetween in which the front mold is removably sealed within and held in position in the gasket by the lower inner edge.

* * * * *